No. 847,404. PATENTED MAR. 19, 1907.
A. L. FOOTE.
DISK LAND CULTIVATOR, HARROW, ROAD MACHINE, AND FARM WAGON.
APPLICATION FILED AUG. 1, 1906.
2 SHEETS—SHEET 1.
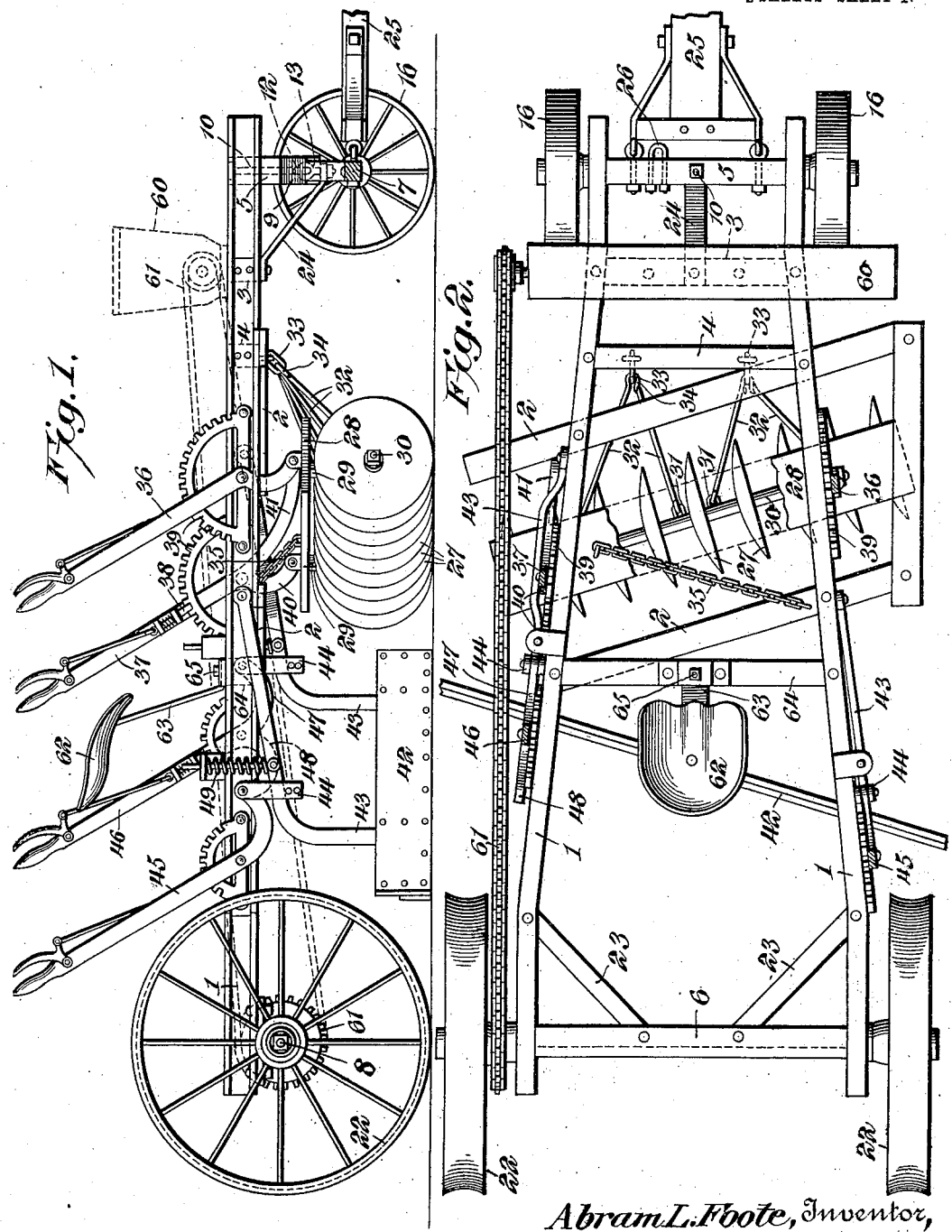
*Abram L. Foote*, Inventor,
Witnesses
By
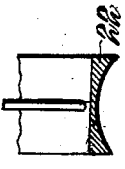
Attorney

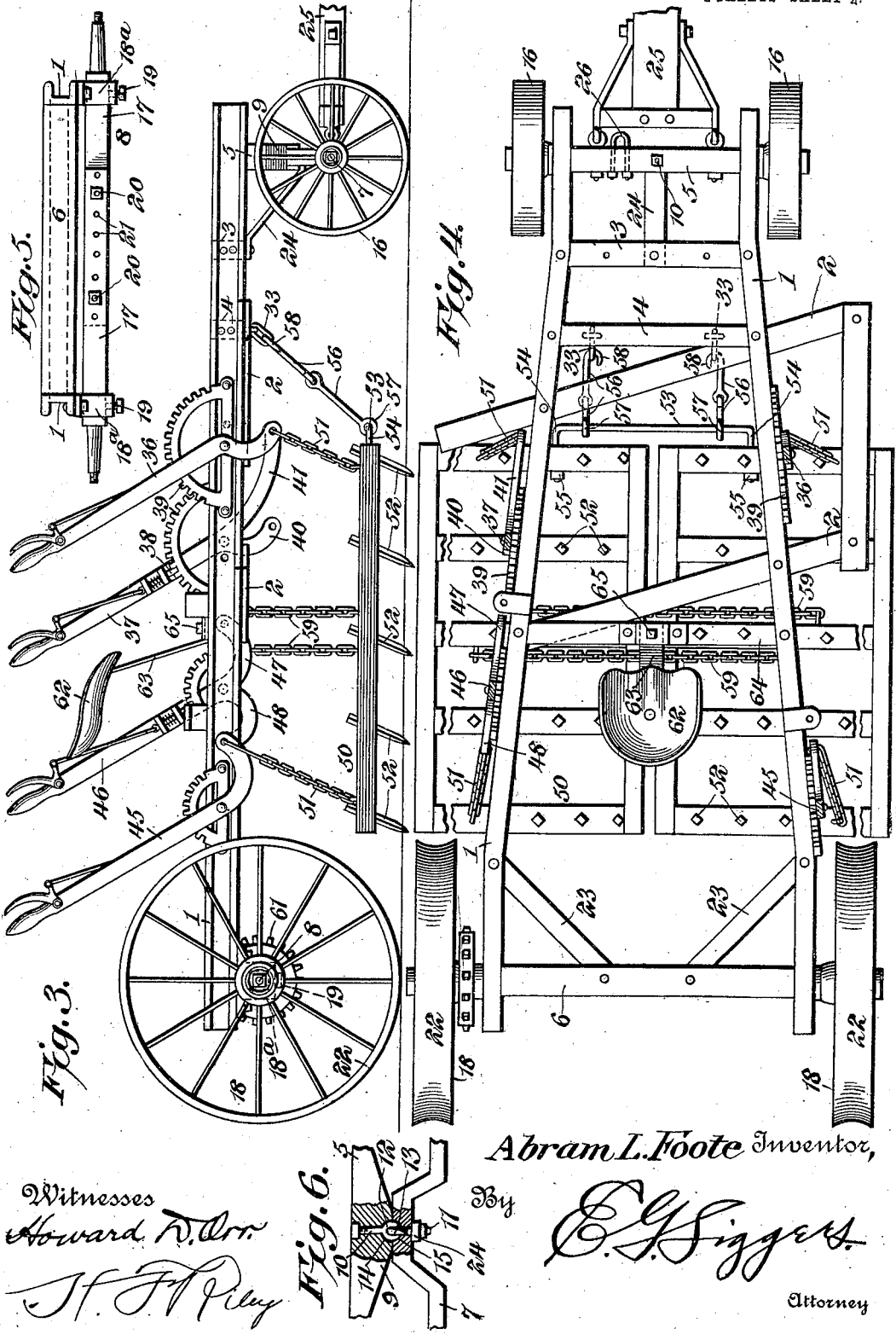

UNITED STATES PATENT OFFICE.

ABRAM LAKIN FOOTE, OF FAYETTE, IOWA.

DISK LAND-CULTIVATOR, HARROW, ROAD-MACHINE, AND FARM-WAGON.

No. 847,404.   Specification of Letters Patent.   Patented March 19, 1907.

Application filed August 1, 1906. Serial No. 328,767.

*To all whom it may concern:*

Be it known that I, ABRAM LAKIN FOOTE, a citizen of the United States, residing at Fayette, in the county of Fayette and State of Iowa, have invented a new and useful Disk Land-Cultivator, Harrow, Road-Machine, and Farm-Wagon, of which the following is a specification.

The invention relates to a disk land-cultivator, harrow, road-machine, and farm-wagon.

The object of the present invention is to improve the construction of the disk land-cultivator, road-machine, and farm-wagon shown and described in Patent No. 816,085, granted to me March 27, 1906, and to provide simple, inexpensive, and efficient means for enabling the disks and the scraper of the machine of the said patent to be readily removed and a harrow to be hung from the frame for use after the land has been operated on by the said disks and scraper.

A further object of the invention is to provide operating mechanism for enabling either a gang of disks and a scraper to be hung from the frame of the machine in an oblique or diagonal position or a harrow to be suspended from the frame with its side bars in parallelism with the median line of the machine.

Also the invention has for its object to enable the harrow to be lifted clear of the ground for moving the machine from one place to another or any one of the corners to be readily raised from the ground for discharging any accumulation from the harrow-teeth when the machine is in operation.

Another object of the invention is to provide means for enabling seed to be sown broadcast in advance of the disks, so as to be covered by the machine.

Furthermore, it is the object of the invention to provide a machine having a running-gear which will permit either of the front wheels to drop into a rut or hole without straining the frame or affecting the horizontality of the same.

With these and other objects in view the invention consists in the construction and novel combination of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a side elevation of a machine constructed in accordance with this invention, the gang of disks and the scraper being in position for operation. Fig. 2 is a plan view of the same. Fig. 3 is a side elevation of the machine, the harrow being hung from the main frame. Fig. 4 is a plan view of the same. Fig. 5 is a detail view illustrating the construction of the rear axle. Fig. 6 is a detail sectional view illustrating the manner of mounting the front axle. Fig. 7 is a detail sectional view of the rim of one of the rear wheels.

Like numerals of reference designate corresponding parts in all the figures of the drawings.

The machine, which is designed for cultivating and sowing land and for smoothing and repairing the surface of roads, may be used as a farm-wagon, hay or stock rack by removing the mechanism from the main frame and placing a wagon-body, hay-frame, or the like on the running-gear. The frame of the machine may be made of uniform width, as illustrated in the said patent; but it is preferably tapered, as clearly shown in Figs. 2 and 4 of the drawings, and it may be constructed either of wood or metal or a combination of the said materials to provide a machine or wagon of the desired size and weight to adapt the machine to the character of the soil or the work to which it is to be put.

The side members 1 of the frame preferably consist of channel steel-beams bent between their terminals to provide the intermediate tapered portion. The side members 1 are connected by means of obliquely-disposed transverse members 2 and by suitable cross-pieces 3 and 4. The side members are also connected by front and rear bolsters 5 and 6, which are supported by front and rear axles 7 and 8. The front bolster 5, which may be constructed in any preferred manner, is provided with a central depending tapered portion 9, which rests upon the central portion of the front axle and which is pivotally and flexibly connected with the same by means of upper and lower pivot members 10 and 11, having eyes 12 and 13 at their contiguous ends. The eyes 12 and 13 are linked into each other, and the depending portion 9 of the front bolster 5 and the front axle 7 are provided in their abutting faces with registering recesses 14 and 15, which receive the eyes 12 and 13 of the pivot members 10 and 11. The pivot members permit the front axle to turn horizontally for changing the direction of the machine, and the flexible joint, formed by the eyes 12 and 13, permits the axle to swing or oscillate in a direction transversely of the machine, so that either of the front wheels 16 may drop into a rut or hole without straining the frame of the machine or disturbing the horizontality of the same. Suitable wear-plates may be interposed between the front axle and the depending portion of the front bolster to prevent the parts from becoming worn.

The rear axle is composed of adjustable overlapped sections 17 and are adapted to be varied in length to enable the rear wheel 18 to run in the furrow between the rows of plants under cultivation. The sections are secured in rectangular boxings 18ª by means of set-screws 19, and the inner overlapped ends of the sections 17 are recessed or reduced and are secured together by bolts 20. Suitable perforations 21 are provided for the reception of the said bolts 20. The rear axle, however, may be made extensible in any other preferred manner, and in order to prevent the land from ditching or washing away by water flowing into the tracks of the rear wheels the latter are provided with concave rims 22, which form a ridge instead of a depression. The ridge is adapted to cause any water to flow to each side of it, and the soil at each side of the wheel-track will be caused to fall upon the same, so that the land will be smooth after the passage of the machine and in much better condition than when a broad flat-rimmed wheel is employed. The inner face of the rim 22 is straight or flat, as this construction provides opposite side faces of sufficient area to prevent any lateral slipping without increasing the weight of the rim and is thereby superior to a curved rim of uniform thickness, which requires a much greater amount of metal to secure side faces of the same area as the rim 22. The frame is strengthened at the rear axle by means of diagonally-arranged braces 23, which extend forwardly from the rear bolster 6 and which are suitably secured to the side beams or members 1. The front axle is also braced by an inclined bar or member 24 extending upwardly and rearwardly from the lower face of the front axle to the cross-bar 3. The terminals of the brace or bar 24 are bent at an angle and are perforated to receive the lower pivot member 11 and a suitable fastening device for securing the brace or bar to the cross-bar 3. A tongue or pole 25 is suitably coupled to the front axle, and an eccentrically-arranged clevis 26 is mounted on the front bolster for the attachment of the doubletree to counteract the side draft incident to the diagonal or oblique arrangement of the gang of disks and the scraper hereinafter described. The draft-animals, however, may be hitched to the machine in any other preferred manner.

The disks 27 are carried by a frame 28, provided with a head-piece and having depending bearing members or arms 29 for a shaft 30. The disks 29, which are mounted for rotation on the shaft 30, may be of any desired construction, but are preferably of the ordinary concavo-convex shape and are suitably spaced on the said shaft. The shaft is provided at suitable intervals with eyes 31 for the attachment of draft-rods 32. The draft-rods, which are arranged in pairs and converge forwardly, are connected at their front ends, by means of links 33, with the cross-bar 4. The front ends of the draft-rods 32 are provided with hooks 34 for detachably engaging the links 33. The disk-carrying shaft is disposed obliquely with relation to the line of the draft in order that the soil engaged by the disks may be properly overturned and removed. A chain 35 or other flexible element is connected with the head of the disk-carrying frame and with the rear cross-bar 2. The chain 35, which is arranged at an inclination, extends transversely of the machine to resist the end thrusts of the gang of disks.

The gang of cultivator-disks is raised and lowered by means of levers 36 and 37, pivoted at the outer sides of the side members 1 and having upwardly-extending handles and provided with spring-actuated dogs or detents 38 for engaging suitable toothed segments 39. The lever 37 is located at a point in rear of the lever 36 to correspond to the oblique or diagonal arrangement of the gang of disks, and it is provided with lower arms 40 and 41. The lower end of the lever 36 and the arm 40 of the lever 37 are pivotally connected with the head of the disk-carrying frame 27, which may be raised or lowered by the levers 36 and 37 either to adjust it the proper depth in the soil or to raise their lower edges above the ground when the machine is to be transported from one place to another. The two ends of the disk-carrying frame are independently adjustable, so that the machine may be arranged for effective operation upon slanting or hilly ground. This construction also enables the machine to be utilized to grade the surface of the ground slantingly, as is sometimes necessary in the making or repairing of roads. The lower arm 41 of the left-hand operating-lever 37 is curved downwardly and forwardly and terminates at a point diametrically opposite the lower end of the right-hand lever 36 for a purpose hereinafter explained.

The scraper 42 is provided with a pair of curved beams 43, constructed substantially the same as those shown and described in the said patent and pivoted at their front ends to the side beams or members 1 of the main or supporting frame. The scraper, which consists of a head-block and a metallic plate, is suitably secured by bolts, rivets, or the like to the lower or rear ends of the beams 43, which are supported in links 44, connected with adjusting-levers 45 and 46. The levers 45 and 46, which are located at opposite sides of the main or supporting frame, are arranged one in advance of the other to correspond to the diagonal disposition of the scraper. The lever 46, which is located at the left-hand side of the machine, is provided with a pair of lower arms 47 and 48, which extend forwardly and rearwardly, as clearly illustrated in Figs. 1 and 3 of the drawings. The forwardly-extending arm 47 is connected with the adjacent scraper-beam 43, and the rearwardly-extending arm 48 is located at a point diametrically opposite the lower arm of the lever 45. The lower arm of the lever 45 curves forwardly and is connected with the beam 43 of the rear end of the scraper.

The scraper is forced into the ground by means of springs 49, constructed, arranged, and operated similar to those in the said patent.

When the gang of disks and the scraper are detached, the lower lever-arms, which are disposed diametrically opposite each other, are adapted to be connected with a rectangular harrow 50, which is preferably composed of two sides or sections, but which may be constructed in any preferred manner. In fact, the machine is designed to be constructed to enable the ordinary harrow owned by a farmer to be hung from the frame. The said lower lever-arms are connected with the harrow-sections at or near the centers of the ends thereof by means of chains 51 or any other suitable flexible connections, and the harrow-sections are provided with suitable harrow-teeth 52. By connecting the operating-levers with the central portions of the ends of the harrow-sections either end of either harrow-section may be readily raised to discharge any accumulation from that corner of the frame. The front ends of the harrow-sections may be provided with any suitable draft attachment, and in the accompanying drawings they are shown connected by a draft attachment 53, consisting of a draft-rod having its ends 54 bent at right angles and extending rearwardly. The rearwardly-extending terminals 54 of the draft attachment pierce the front bars or members of the sections of the harrow-frame and are secured to the same by nuts 55 or other suitable means. The draft attachment is connected by links 56 or other suitable flexible connections with the links 33 of the transverse bar 4. The links 56 are preferably composed of two jointed rods or members, as shown, and have rear eyes 57, through which the rod of the draft attachment 53 passes. The front ends of the link connections 56 are provided with hooks 58 for engaging the said links of the transverse bar 4. The harrow may be raised and lowered to lift it clear of the ground for moving the machine from one place or field to another, and the said harrow may also be adjusted to suit the character of soil when the machine is in operation, and the adjusting-levers, which are connected with the sections of the harrow-frame, will enable either end or any one of the corners to be lifted clear of the ground for discharging any accumulation. After the land has been disk-cultivated it may be smoothed by the harrow, and instead of employing the rigid harrow-teeth 52 (shown in the accompanying drawings) spring-teeth of any preferred form may be used. The harrow-sections are connected with the opposite sides of the main or supporting frame by oppositely-inclined chains 59, which are crossed and which form flexible stays or braces. These stays or braces hold the harrow against lateral displacement and at the same time do not interfere with any adjustment of the harrow through the operating-levers.

In order to enable the machine to be used for sowing broadcast, a seedbox or hopper 60 is mounted on the front of the frame and extends transversely of the same. This seed-box or hopper, which may be of any desired construction, is provided with suitable feed mechanism, which is preferably connected with sprocket-gearing 61 with one of the rear wheels. The sprocket-gearing is located exteriorly of one side of the frame; but any other form of operating mechanism may be employed. The seed is deposited in advance of the gang of disks, which turn the soil and properly cover the seed.

A centrally-arranged seat 62 is provided for the accommodation of the driver or operator. The seat, which has a spring-standard 63, is adjustably secured on an intermediate transverse bar 64 by a set-screw 65, mounted on a metal box, which receives the spring-standard.

The gang of disks and the harrow are located a sufficient distance in rear of the front wheels to enable the machine to be easily turned as freely as any ordinary wagon.

Having thus fully described my invention, what I claim as new, and desire to secure by Letters Patent, is—

1. A machine of the class described having a main frame and provided at opposite sides thereof with levers arranged in pairs, the levers at one side of the frame being provided with lower arms arranged in diagonal relation with and also at points diametrically opposite the lower arms of the levers at the opposite side of the frame, whereby cultivating devices may be hung from the frame either in a diagonal position or in parallelism with the median line of the machine.

2. In a machine of the class described, the combination with a frame and cultivating devices, of levers arranged in pairs at opposite sides of the frame and located in diagonal relation, the levers at one side of the frame being provided with supplemental arms arranged diametrically opposite the levers at the opposite side of the frame, and means for suspending the cultivating devices from the levers either in a diagonal position or in parallelism with the median line of the machine.

3. In a machine of the class described, the combination with a frame and cultivating means, of front and rear operating-levers arranged in pairs at opposite sides of the frame and having lower arms arranged in diagonal relation, the front lever at one side of the frame being also provided with a forwardly-extending supplemental arm, and the corresponding rear lever having a supplemental rearwardly-extending arm, the supplemental arms being disposed diametrically opposite the arms of the levers at the opposite side of the frame, and means for connecting the opposite levers with the cultivating means.

4. In a machine of the class described, the combination of a wheeled frame, operating-levers located at opposite sides of the main frame in diagonal relation, the levers at one side having supplemental arms arranged diametrically opposite the levers at the opposite side, and a harrow suspended from the supplemental arms and from the levers from the opposite side of the frame.

5. In a machine of the class described, the combination of a wheeled frame, operating-levers located at opposite sides of the main frame in diagonal relation, the levers at one side having supplemental arms arranged diametrically opposite the levers at the opposite side, and a harrow suspended from the supplemental arms and from the levers from the opposite side of the frame, and crossed inclined chains extending from the sides of the main frame to the opposite sides of the harrow.

In testimony that I claim the foregoing as my own I have hereto affixed my signature in the presence of two witnesses.

ABRAM LAKIN FOOTE.

Witnesses:
JOHN H. SIGGERS,
H. F. RILEY.